United States Patent
Davis et al.

(10) Patent No.: US 10,367,950 B2
(45) Date of Patent: Jul. 30, 2019

(54) DEVICE NOTIFICATION ADJUSTMENT DEPENDENT ON USER PROXIMITY

(71) Applicant: Lenovo (Singapore) Pte. Ltd., Singapore (SG)

(72) Inventors: Mark Charles Davis, Durham, NC (US); Douglas Warren Robinson, Raleigh, NC (US); Jennifer Greenwood Zawacki, Hillsborough, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 105 days.

(21) Appl. No.: 14/301,706

(22) Filed: Jun. 11, 2014

(65) Prior Publication Data
US 2015/0365540 A1 Dec. 17, 2015

(51) Int. Cl.
*H04B 1/38* (2015.01)
*H04M 19/04* (2006.01)

(52) U.S. Cl.
CPC ................ *H04M 19/042* (2013.01)

(58) Field of Classification Search
CPC ............ H04M 19/042; H04M 19/047; H04M 19/048; H04W 4/008
USPC ................ 455/421, 66.1, 67.7, 567
See application file for complete search history.

(56) References Cited

U.S. PATENT DOCUMENTS

| | | | |
|---|---|---|---|
| 7,469,155 B2 * | 12/2008 | Chu | H04M 1/72569 455/456.1 |
| 8,050,706 B2 | 11/2011 | Li | |
| 8,958,537 B1 * | 2/2015 | Saylor | H04M 3/42068 379/142.04 |
| 9,125,144 B1 * | 9/2015 | Orbach | H04M 19/04 |
| 2003/0013496 A1 * | 1/2003 | Kim | H04M 19/04 455/567 |
| 2004/0127198 A1 * | 7/2004 | Roskind | H04M 1/72566 455/412.2 |
| 2004/0214594 A1 | 10/2004 | Holman, IV | |
| 2007/0037605 A1 | 2/2007 | Logan | |
| 2009/0220062 A1 * | 9/2009 | Wu | H04M 1/57 379/201.01 |
| 2010/0167795 A1 * | 7/2010 | Huang | H04M 1/72563 455/567 |
| 2010/0317332 A1 * | 12/2010 | Bathiche | H04B 1/202 455/418 |

(Continued)

FOREIGN PATENT DOCUMENTS

| | | |
|---|---|---|
| CN | 101212748 A | 7/2008 |
| EP | 2207331 A1 | 7/2010 |

(Continued)

*Primary Examiner* — Tuan Pham
(74) *Attorney, Agent, or Firm* — Ference & Associates LLC

(57) ABSTRACT

An aspect provides a method, including: detecting a received communication at a device; detecting, using a device orientation sensor, orientation data relating to device orientation; the orientation data being associated in time with the received communication; determining, using the orientation data, a value for a magnitude of a notification of the received communication; and adjusting, using a processor of the device, the magnitude of the notification of the received communication according to the value. Other aspects are described and claimed.

19 Claims, 5 Drawing Sheets

(56) References Cited

U.S. PATENT DOCUMENTS

| | | | | |
|---|---|---|---|---|
| 2011/0151939 A1* | 6/2011 | Wang | ................ | H04M 1/72519 |
| | | | | 455/567 |
| 2012/0242698 A1* | 9/2012 | Haddick | ............ | G02B 27/0093 |
| | | | | 345/633 |
| 2014/0004799 A1* | 1/2014 | Masuda | ............ | H04W 52/0225 |
| | | | | 455/41.2 |
| 2014/0094202 A1* | 4/2014 | Xu | ........................ | H04M 1/575 |
| | | | | 455/458 |
| 2014/0143064 A1* | 5/2014 | Tran | .................... | A61B 5/0022 |
| | | | | 705/14.66 |
| 2014/0232534 A1* | 8/2014 | Birnbaum | ............... | G06F 3/016 |
| | | | | 340/407.1 |
| 2014/0305204 A1* | 10/2014 | Hong | .................... | A63B 71/06 |
| | | | | 73/504.08 |
| 2015/0256685 A1* | 9/2015 | Amberden | ............ | H04M 19/04 |
| | | | | 455/567 |

FOREIGN PATENT DOCUMENTS

| | | | |
|---|---|---|---|
| WO | 2006057770 | A2 | 6/2006 |
| WO | 2008021842 | A2 | 2/2008 |
| WO | 2012156577 | A1 | 11/2012 |
| WO | 2013049048 | A2 | 4/2013 |
| WO | 2014209405 | A1 | 12/2014 |

\* cited by examiner

DEVICE NOTIFICATION ADJUSTMENT DEPENDENT ON USER PROXIMITY

BACKGROUND

Information handling devices ("devices"), for example cell phones, smart phones, tablet devices and the like, have communication capabilities, including messaging and voice call application functionality. Such devices provide a notification, for example an audible ring or tone, vibration, and/or visual notification, on receipt of a communication such as a voice call. Certain notification scenarios may conspire to frustrate the users of such devices, e.g., with respect to being notified about a received voice call.

A common example is a missed call due to inadequate notification with respect to a user that is not proximate to the device. When a user is close to the device, e.g., smart phone, a quiet ring is sufficient to denote an incoming call. When the smart phone is further from the user (e.g., more than 6 feet) then a louder ring is required. The user can manually adjust the ring tone volume, but this will not be of any use in many situations. Also, profiles with different volumes can be selected by the user; however, this is also inconvenient, prone to being misapplied, and prone to being forgotten.

BRIEF SUMMARY

In summary, one aspect provides a method, comprising: detecting a received communication at a device; detecting, using a device orientation sensor, orientation data relating to device orientation; the orientation data being associated in time with the received communication; determining, using the orientation data, a value for a magnitude of a notification of the received communication; and adjusting, using a processor of the device, the magnitude of the notification of the received communication according to the value.

Another aspect provides a device, comprising: a processor; at least one device sensor operatively coupled to the processor; a communication element that receives a communication; an output element that provides a notification of a received communication; and a memory operatively coupled to the processor that stores instructions executable by the processor, the instructions comprising: instructions that detect a received communication; instructions that detect, using a device orientation sensor, orientation data relating to device orientation; the orientation data being associated in time with the received communication; instructions that determine, using the orientation data, a value for a magnitude of a notification of the received communication; and instructions that adjust the magnitude of the notification of the received communication according to the value.

A further aspect provides a method, comprising: detecting a received communication at a device; detecting, using a device sensor, biometric data relating to a user; the biometric data being associated in time with the received communication; determining, using the biometric data, a value for a magnitude of a notification of the received communication; and adjusting, using a processor of the device, the magnitude of the notification of the received communication according to the value.

A still further aspect provides a method, comprising: detecting a received communication at a device; detecting, using a device element, device status data relating to another device; the device status data being associated in time with the received communication; determining, using the device status data, a value for a magnitude of a notification of the received communication; and adjusting, using a processor of the device, the magnitude of the notification of the received communication according to the value.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
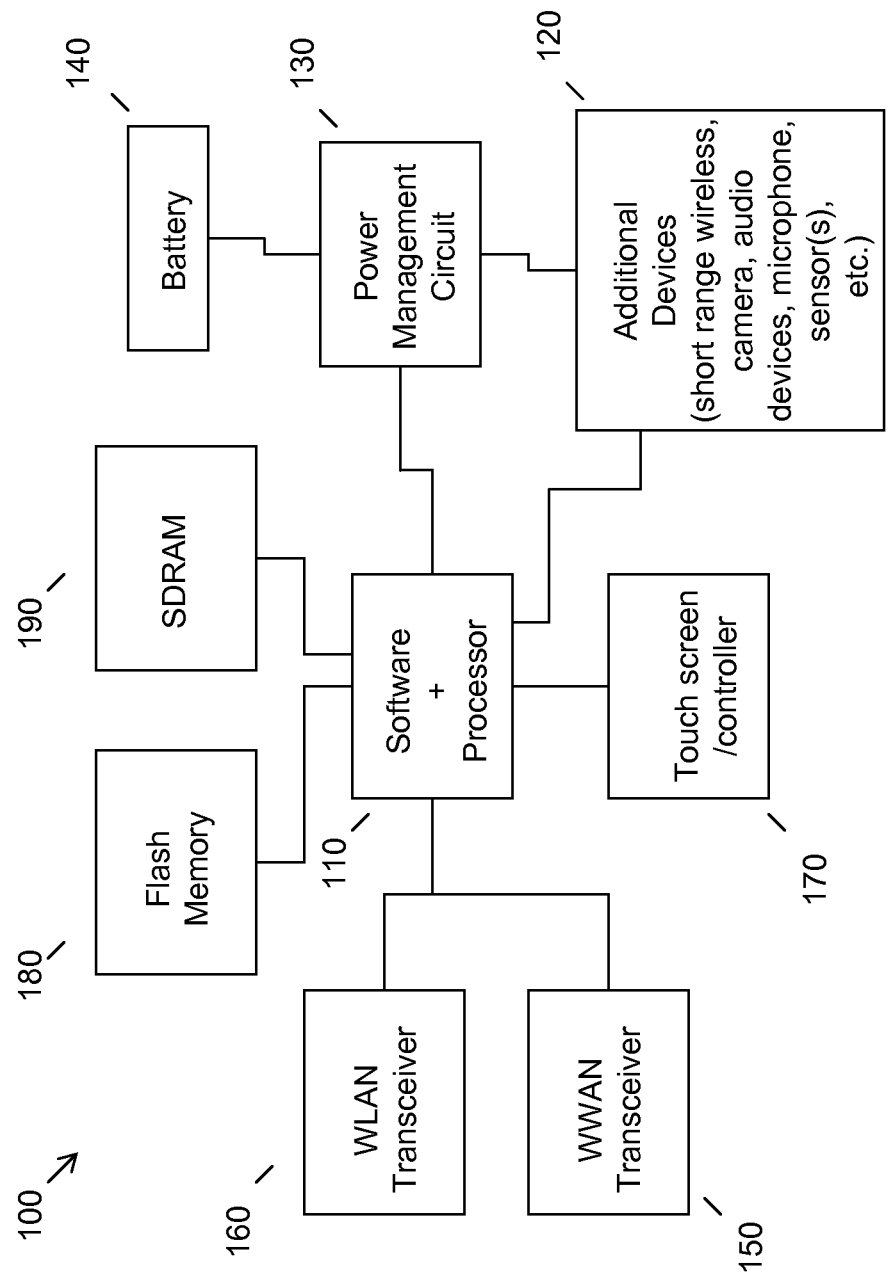
FIG. 1 illustrates an example information handling device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides device notification adjustment dependent on user proximity. An embodiment may make notification adjustment in three phases, i.e., first detecting the device is not co-located with or proximate to a user, next accessing applicable administrative function(s), if any, and thereafter adjusting the notification to customize it to the current use context.

An embodiment may determine that a device such as a smart phone or tablet it is not with (proximate to) the user using several techniques, which may be employed alone or in a suitable combination. For example, a sensor, e.g., an on-device light or other proximity sensor such as a camera may be used to detect proximity of the user directly and/or to detect context data that may be used to infer user proximity. By way of example, a context of a smart phone in a pocket, purse or holster may be determined, e.g., using a light sensor, and it may be inferred that the device is thus proximate to or with the user. If additional or other sensors are employed, additional data may be available to detect or infer user-device proximity, e.g., use of a sensor such as a camera to capture images of user(s), including of a particular user using biometric identification. Thus, it will be understood that likewise a detection of a prolonged time out of these low-light locations or environment may indicate that phone is not carried by or proximate to the user.

Moreover, data of one or more than one sensor may be used to detect and/or compliment or add to the accuracy of the user-device proximity detection, e.g., 9-axis location data of the device. By way of example, orientation data of an orientation sensor or sensors may be used by an embodiment to infer that the user is or is not proximate to the device. For example, if a phone is perfectly horizontal it may be concluded that the phone is not carried by the user. Additionally, this or other 9-axis data, e.g., motion data, may be combined with another proximity sensor such an ambient light sensor or a camera to infer or detect that the device is not proximate to the user.

Additional data may be collected by a device and used in the user-device proximity determination. For example, distance between the device and a wearable device may provide useful data for detecting user proximity. By way of example, if the end user normally employs a wearable device (such as a health monitor or smart watch) with wireless connectivity to his or her smart phone device and the wearable device is not in range, such an out of range detection may indicate that the phone is not proximate to the user. Similarly, a microphone may be employed, e.g., capturing audible data and processing/searching it for end user activity proximate to the device, including detecting a particular predetermined user, e.g., using biometrics. Thus, if a user's voice is/is not detected for a predetermined time, and/or if no other human related sounds such as breathing are detected, an embodiment may process this data as an indication that the device is not carried by the user.

An embodiment may employ other inputs in making an inference regarding user-device proximity. For example, charging status of the device may be employed, either alone or in combination with other sensor inputs. By way of example, if a device such as a smart phone or tablet is being charged or is otherwise coupled to a peripheral device (charging or not), e.g., attached to a cable other than earphones, it is more likely that the user is absent or not proximate to the device. This, along with other inputs, e.g., no motion detected, orientation indicative of lying flat, etc., may further inform this determination.

It will be appreciated that often the combination of factors, with weighting thereof, gives a much better indication of user-device proximity than a single sensor input alone. Moreover, timing information, e.g., the duration of the condition, its sequence of occurrence, etc., may be evaluated. For example, a device that is motionless, e.g., on a table, with no human noises detectable for several minutes would be a better indicator that a user is not proximate to the device than just one sensor result (e.g., motionless, noiseless, etc.). Similarly, charging and no motion detected for three hours would be a strong indication of no proximate user as compared with a detection of charging and no motion for 10 seconds.

To improve the results and inform the end user, an embodiment may provide some administrative functions related to notification adjustments. For example, if some indication(s) are detected relating to user-device proximity, e.g., that the user is not with the device, is/are occurring, a warning or like indication of such a status may be provided, e.g., displayed on a display of the smart phone. Likewise, an embodiment may provide an interface, such as a settings menu, which indicates current values for items that are or could be monitored, and weights associated therewith, may be provided. In an embodiment, the interface may allow a user to manually configure these settings. For example, the end user could add a smart watch as a method for proximity detection. An embodiment may automatically adjust the settings, e.g., weights applied to various indicators, use or non-use of particular indicators, such as by way of implementing machine learning. Such user settings configuration may be used to refine multi-factor user-device proximity inferences. By way of example, if a device is being charged in a docking station over a predetermined time, e.g., from midnight to 6 a.m., this may initially be mapped to a context in which the user is determined to not be proximate to the device. However, the user may nonetheless wish to avoid notifications. A manual configuration of the user-device proximity settings may therefore allow the user to adjust the notifications in this regard.

An embodiment may adjust the notification(s), e.g., of an incoming call, based on the device receiving the communication being a determined distance from the end user. This adjustment may take place in several ways. For example, if an embodiment detects that the user is not located proximate to the device, e.g., within several feet, the magnitude (e.g., volume of a ringtone) of a notification associated with an incoming voice call may be increased. Haptic feedback such as vibration may also be turned off in this context, since this mode of feedback or notification is not optimized for non-proximate use. Ringing or like audible notification may be extended, including extending the audible notification to continue after the calling party has hung up (e.g., a predetermined number or rings and/or with a modified audible sound). For example, after the voice call has been disconnected, a ring tone may continue and optionally may be audibly changed to indicate that a call was missed. Among other things, this makes the device easier to find and makes it more likely that the end user will know that a call was missed.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a sensor such as a microphone, a camera, an orientation sensor included in a 9-axis sensor module, etc. Additional devices may include short range wireless radio(s), such as BLUETOOTH radios, for communicating with other devices (e.g., wearable devices). Near field communication element(s) may also be included as additional device(s) 120. Commonly, system 100 will include a touch screen/controller 170 for data input and display. System 100 also typically includes various memory devices, for example flash memory 180 and SDRAM 190.

Figure 2:
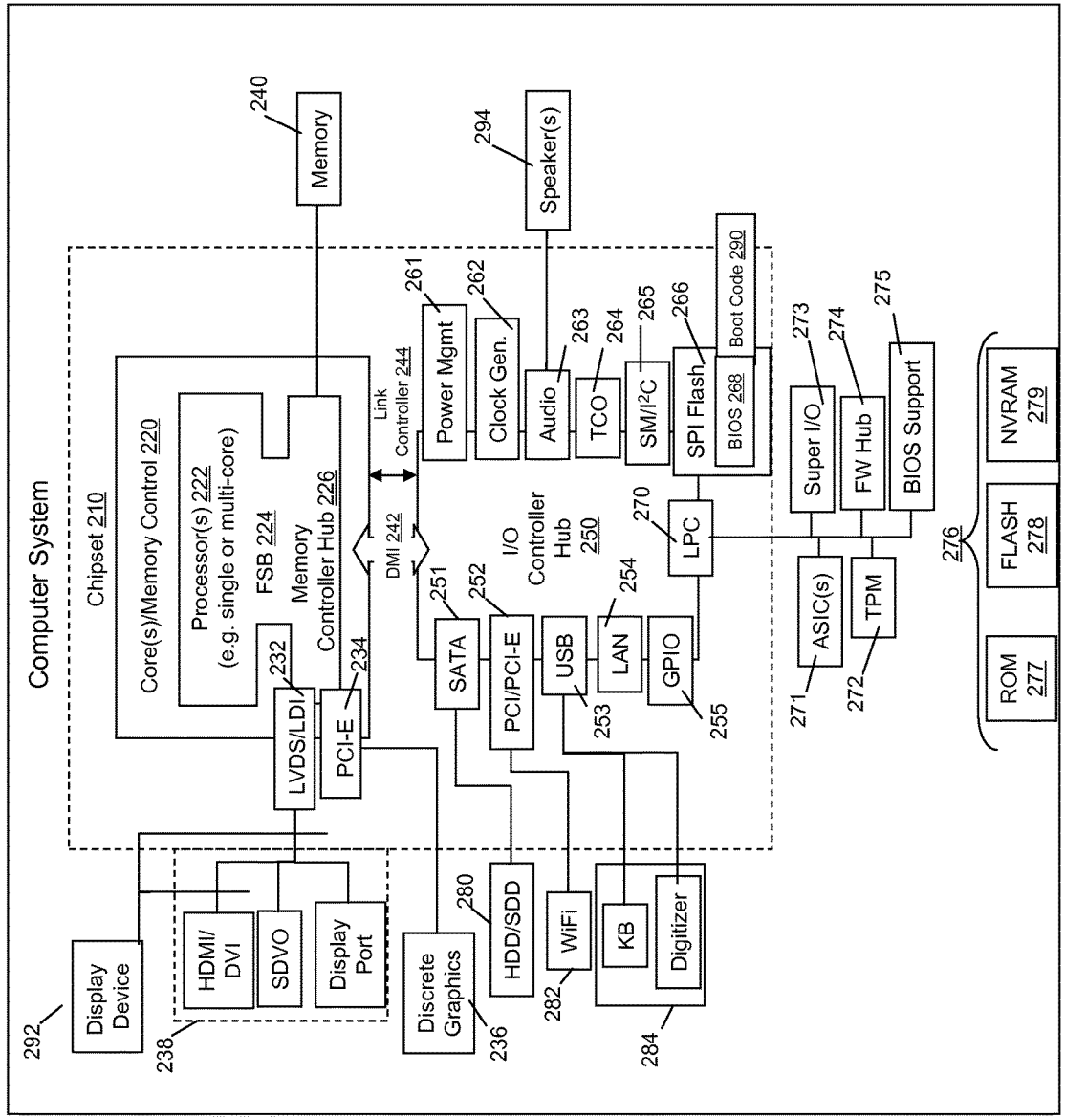
FIG. 2 illustrates another example information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, etc.) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Figure 3:
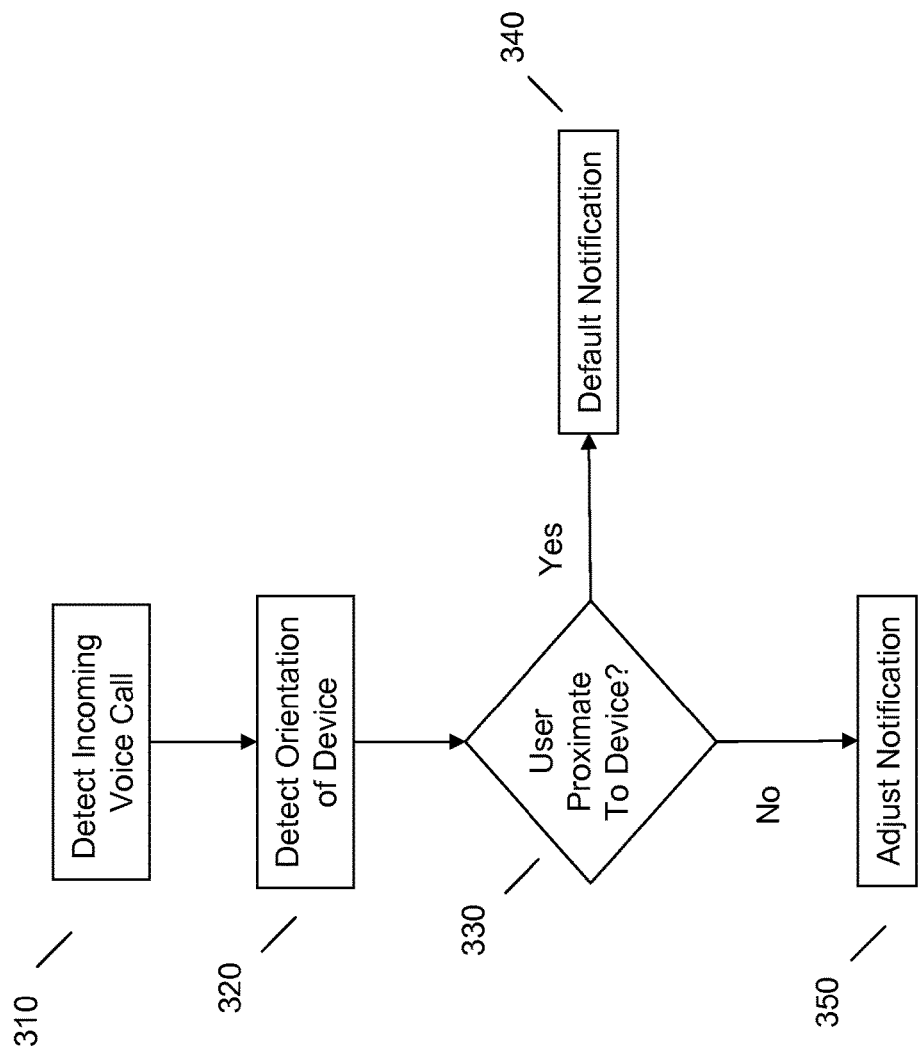
FIG. 3 illustrates an example method of adjusting a notification.

Information handling device circuitry, as for example outlined in FIG. 1 or FIG. 2, may be used in devices such as tablets, smart phones and/or other portable devices with which a user receives communications, e.g., voice calls, and is provided with a notification thereof. Referring to FIG. 3, an embodiment will detect an incoming voice call 310. The incoming voice call may be in a variety of formats, for example a voice call over a wireless cellular network or a voice call placed over an Internet connection, for example according to VOIP (whether wired or wireless connection is established between the device and the network). On detecting an incoming voice call at 310, an embodiment accesses data at 320, e.g., device orientation data from a 9-axis sensor module, to detect device orientation. An embodiment may use the sensor data, e.g., orientation data derived from a geomagnetic sensor along one or more axes, to determine a device orientation associated in time with the receipt of the incoming communication.

With the detecting of device orientation at or associated in time with an incoming voice call at 320, an embodiment may make a determination as to whether the user is proximate to the device at 330. In this regard, an embodiment may detect a particular device orientation and/or history of recent device orientations, such as laying flat for a predetermined time without change in attitude, that map/maps to a particular user-device proximity context. For example, a device having a particular orientation during the incoming communication detected at 310 may indicate or map to a context predetermined to be a user located away from the device. Likewise, another device orientation, as detected at 320, may be mapped to another user-proximity device context, such as the user being proximate to the device.

If the user is proximate to the device, as determined at 330, an embodiment may maintain the default notification at 340, i.e., not adjust the notification. However, if the user is not proximate to the device, as determined at 330, an embodiment may adjust the notification at 350 such that it is more readily perceived by or noticeable to the user. For example, an embodiment may adjust the notification at 350 such that the magnitude of the ring is increased (e.g., louder ring). Likewise, an embodiment may adjust the notification such that the notification continues on after the caller has hung up. In a similar fashion, an embodiment may adjust the notification by choosing a different audible sound for the continued rings (e.g., for a predetermined time and/or a predetermined number of rings) during the continued ringing after the caller has terminated the communication.

Figure 4:
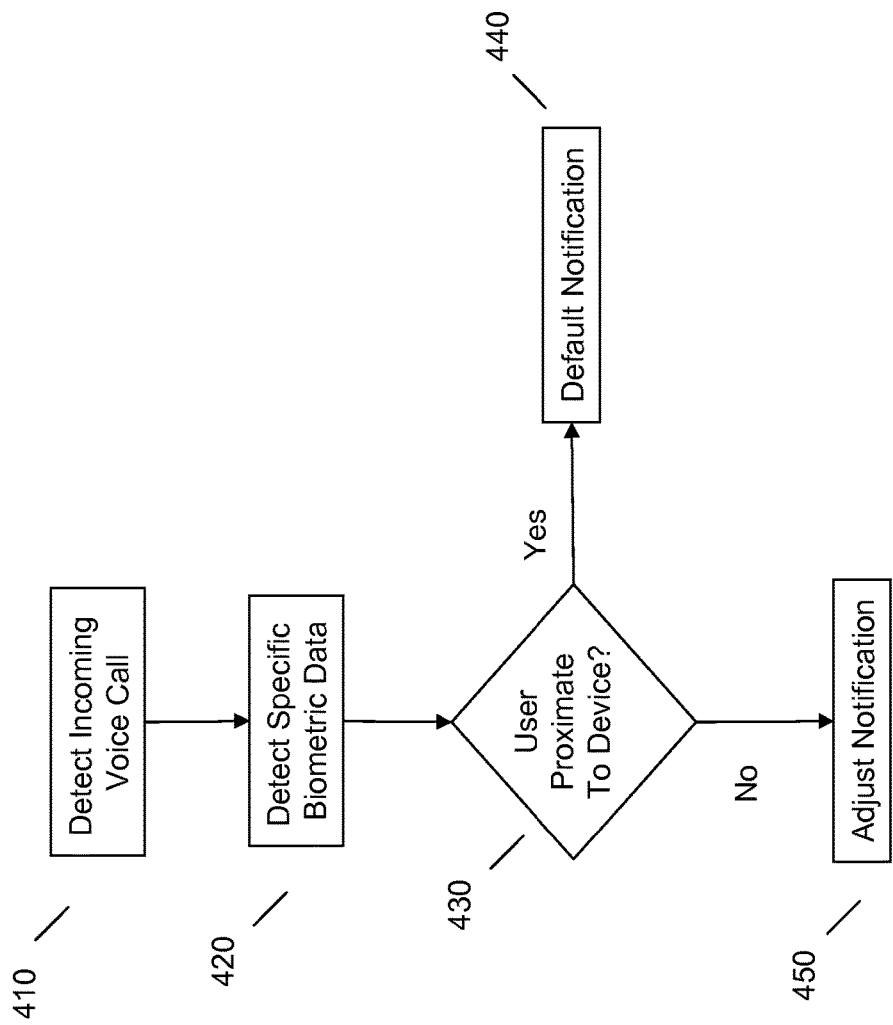
FIG. 4 illustrates another example method of adjusting a notification.

Referring to FIG. 4, an embodiment may determine user-device proximity in other ways. For example, an embodiment detecting an incoming voice call at 410 may access other data at 420, e.g., specific biometric data such as specific audio data and/or specific visual data associated with a predetermined user. An embodiment may use the other data, e.g., specific audio data of a particular user captured through a microphone of the device and processed at 420, to determine a user is detectable (in range of a camera, a microphone, or a combination thereof) and is associated in time with the receipt of the incoming communication. For example, an embodiment may detect and process at 420 audio data to match the collected audio data with the device owner as compared to background noise, e.g., of others and/or machine generated voice data (radio, television, etc.).

With the detecting of a specific user in range of the sensor(s) in question, e.g., a camera or a microphone, at or associated in time with an incoming voice call at 420, an embodiment may make a determination as to whether the user is proximate to the device at 430. In this regard, an embodiment may detect a particular biometric data input, such as speaker identification of a particular user within a predetermined time of the incoming communication detected at 410, maps to a particular user-device proximity context. For example, a device having a particular user detectable during the incoming communication detected at 410 may indicate or map to a context predetermined to be a user located near the device. Likewise, another data context, e.g., biometric input data not received within a predetermined time of the incoming communication detected at 410, may be mapped to another user-proximity device context, such as the user being away from the device.

If the user is proximate to the device, as determined at 430, an embodiment may maintain the default notification at 440, i.e., not adjust the notification. However, if the user is not proximate to the device, as determined at 430, an embodiment may adjust the notification at 450 such that it is more readily perceived by or noticeable to the user. For example, an embodiment again may adjust the notification at 450 such that the magnitude of the ring is increased such that a ring is louder, etc.

Figure 5:
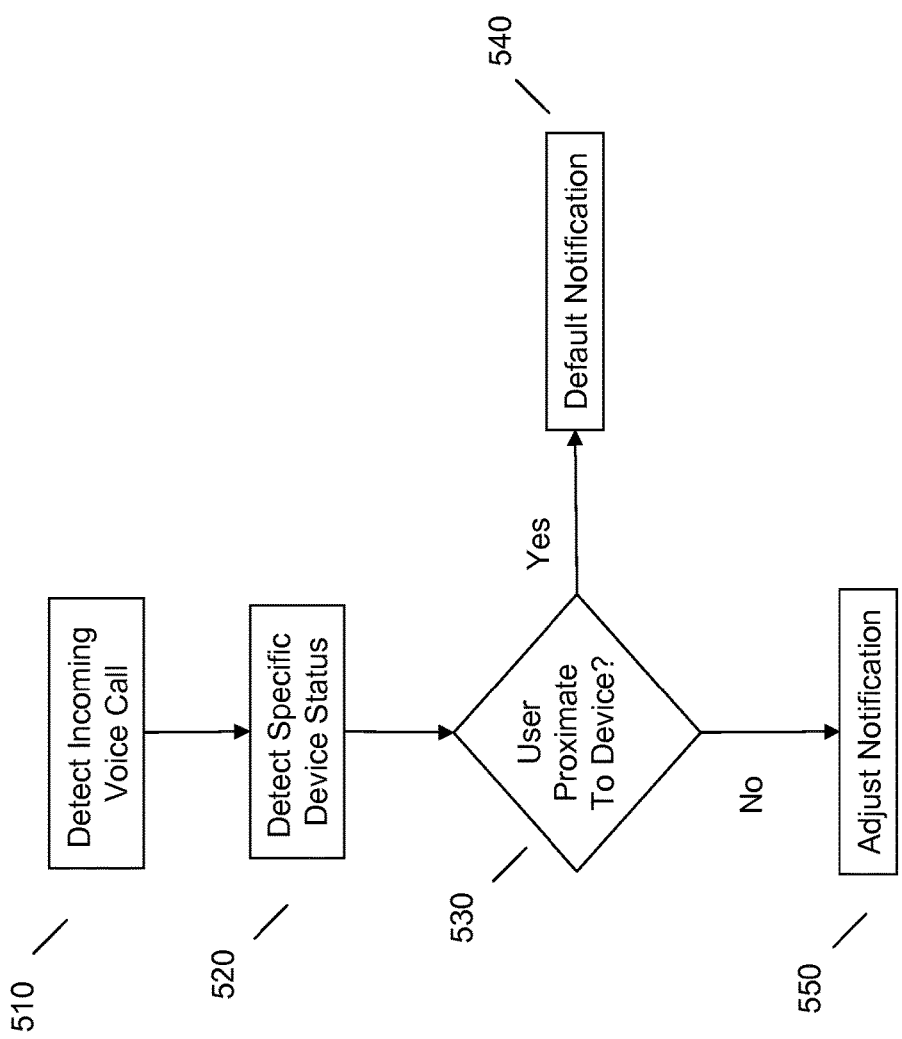
FIG. 5 illustrates a further example method of adjusting a notification.

An embodiment may determine user-device proximity in still other ways. For example, as illustrated in FIG. 5, an embodiment detecting an incoming voice call at 510 may access other data at 520, e.g., specific device status data such as data indicating specific peripheral device(s) is/are paired with or attached/coupled to the device (e.g., wearable device (s) paired with a phone, specific cables, e.g., charging cable, USB cable, etc., attached to the device, e.g., for charging or playing specific media, etc.). An embodiment may use the other data, e.g., specific device data such as data indicating that a peripheral device is connected via a wired or wireless connection, to infer or determine that a user is proximate to the device during a time associated with the receipt of the incoming communication, detected at 510.

With the detecting of specific device status data indicative of an in range user, e.g., via available charging or pairing/connecting data detected at 520, an embodiment may make a determination as to whether the user is proximate to the device on the basis thereof at 530. In this regard, an embodiment may detect a particular charging cable and/or wearable device is associated with the device, e.g., smart phone, within a predetermined time of the incoming communication detected at 510, and that this maps to a particular user-device proximity context. For example, a device having a particular wearable device detectable during the incoming communication detected at 510 may indicate or map to a context predetermined to be a user located near the device context. Likewise, other device status data, e.g., charging cable attached for a predetermined time prior to the incoming communication detected at 510, may be mapped to another user-proximity device context, such as the user being away from the device.

If the user is proximate to the device, as determined at 530, an embodiment may maintain the default notification at 540, i.e., not adjust the notification. However, if the user is not proximate to the device, as determined at 530, an embodiment may adjust the notification at 550 such that it is more readily perceived by or noticeable to the user. For example, an embodiment again may adjust the notification at 550 such that the magnitude of the ring is increased, etc. As another example, an embodiment may switch the mode of notification, e.g., turning off a haptic notification mode in response to detecting a wearable device or a charging cable, as haptic feedback will not be as readily perceivable to the user.

Thus it will be appreciated that an embodiment detects a received communication at a device, such as a voice call, and detects, using one or more sensors, data relating to user-device proximity. This data may include device orientation data, biometric data, and/or specific device status data. As may be appreciated from the foregoing, combinations of data and/or different weightings, particularly if applied in combination with a use history and/or user modifications, will more appropriately infer or determine user-device proximity status. Therefore the combination of data available to an embodiment, e.g., particular orientation, particular devices connected, particular biometric data available, may be combined for a user-device proximity determination that is highly accurate. Moreover, an embodiment may improve the accuracy over time via adjusting the data used, and the weighting thereof, in response to particular events such as detected via user inputs.

Using such data (including combinations thereof), an embodiment may determine, e.g., using the orientation data, a value for a magnitude of a notification of the received communication. This may be used by an embodiment for adjusting, e.g., using a processor of the device, the magnitude of the notification of the received communication according to the value. Thus, the value may map to a particular user-device proximity context, e.g., user away, and thus influence the magnitude and/or mode of the notification.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage device. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage device may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting a received communication at a device;
   detecting, using at least one device sensor, a device environmental context, wherein the device environmental context is detected using at least one of: device orientation, ambient light level, user biometric data, and connectivity status;
   the detected device environmental context being associated in time with the received communication;
   identifying a proximity of a user to the device by mapping the device environmental context to one of a plurality of user-proximity device contexts, each identifying a proximity of the user to the device; and
   adjusting, based upon the user not being proximate to the device, the magnitude of the notification of the received communication from a notification sound value set before receipt of the communication to an increased adjusted value.

2. The method of claim 1, wherein the detecting a device environmental context comprises detecting, using the at least one device sensor, user biometric data;
   wherein the value for the magnitude of the notification is determined using the biometric data.

3. The method of claim 2, wherein the detecting a device environmental context comprises detecting if a user is proximate to the device and wherein the detecting if the user is proximate to the device comprises matching audible data to a specific predetermined user.

4. The method of claim 1, wherein the connectivity status comprises a charging status;
   wherein the value for the magnitude of the notification is determined using the charging status.

5. The method of claim 1, wherein the adjusting further comprises adjusting the duration of the notification of the received communication and wherein the adjusting the duration comprises adjusting one or more of a volume of a ring and a sound of a ring for the predetermined number of rings beyond voice call termination.

6. The method of claim 1, further comprising adjusting, using a processor of the device, the mode of the notification of the received communication according to the value.

7. The method of claim 6, wherein adjusting the mode comprises switching off a haptic mode of notification.

8. The method of claim 1, wherein the detecting a device environmental context comprises detecting, using a device communication element, proximity of a predetermined wearable user device;
   wherein the value for the magnitude of the notification is determined using the proximity of the predetermined wearable user device.

9. A device, comprising:
   a processor;
   at least one device sensor operatively coupled to the processor;
   a communication element that receives a communication;
   an output element that provides a notification of a received communication; and
   a memory operatively coupled to the processor that stores instructions executable by the processor to:
   detect a received communication;
   detect, using at least one device sensor, a device environmental context, wherein the device environmental context is detected using at least one of: device orientation, ambient light level, user biometric data, and connectivity status;
   the detected device environmental context being associated in time with the received communication;
   identify a proximity of a user to the device by mapping the device environmental context to one of a plurality of user-proximity device contexts, each identifying a proximity of the user to the device; and
   adjust, based upon the user not being proximate to the device, the magnitude of the notification of the received communication from a notification sound value set before receipt of the communication to an increased adjusted value.

10. The device of claim 9, wherein the instructions to detect a device environmental context comprise instructions to detect, using the at least one device sensor, biometric data; and wherein the value for the magnitude of the notification is determined using the biometric data.

11. The device of claim 10, wherein the processor matches audible data to a specific predetermined user.

12. The device of claim 9, further comprising a charging element;

wherein the value for the magnitude of the notification is determined using the charging status of the charging element.

13. The device of claim 9, wherein to adjust further comprises to adjust the duration of the notification of the received communication and wherein the duration is adjusted by adjusting one or more of a volume of a ring and a sound of a ring for the predetermined number of rings beyond voice call termination.

14. The device of claim 9, wherein the processor adjusts the mode of the notification of the received communication according to the value.

15. The device of claim 14, wherein adjusting the mode comprises switching off a haptic mode of notification.

16. The device of claim 9, wherein the instructions to detect a device environmental context comprises instructions to detect, using a device communication element, proximity of a predetermined wearable user device; and wherein the value for the magnitude of the notification is determined using the proximity of the predetermined wearable user device.

17. The device of claim 9, wherein the at least one device sensor comprises a 9-axis device sensor.

18. The method of claim 1, wherein the detecting a proximity of a user comprising detecting, using a device orientation sensor, orientation data relating to device orientation.

19. The device of claim 9, wherein the instructions to detect a proximity of a user comprise instructions to detect, using a device orientation sensor, orientation data relating to device orientation.

* * * * *